United States Patent Office 3,532,661
Patented Oct. 6, 1970

---

3,532,661
IMPREGNATING VARNISH FOR ELECTRIC MOTORS WOUND WITH WIRE ENAMELLED WITH POLYESTER-IMIDE
Henri P. Vayson de Pradenne, Paris, France, assignor to Societe Generale de Constructions Electriques et Mecaniques (Alsthom), Paris, France
No Drawing. Filed Feb. 24, 1967, Ser. No. 618,353
Claims priority, application France, Mar. 9, 1966, 2,676
Int. Cl. C08g 41/00, 51/36
U.S. Cl. 260—31.2
6 Claims

ABSTRACT OF THE DISCLOSURE

Varnish useful for impregnating electrical structures such as coils has alternate trimellitic diimide and hydroxylated terephthalate polyester groups, is compatible with terephthalate polyester and trimellitic polyimide group containing polyester-imide wire enamel and is soluble in readily available solvents such as butyl acetate, butyl acetate-xylene mixtures and the like.

---

The present invention relates to an impregnating varnish intended to be used for motors wound with wire enamelled with polyester-imides. As is known, best results are obtained in impregnation when the resin, of which the solution in a solvent medium constitutes the varnish, has a chemical constitution very close to that used for enamelling the conductors, which assures complete compatibility betwen the two resins forming the final insulation, insures that the thermal class of the enamel is maintained, and gives a homogeneous insulation. In addition, and in order to fulfill its role of bonding between the component parts of the motor and to fill its function as a protective coating agent, it is required that this impregnating resin have good flexibility. It is advantageous that its noncorrosive solvent be easily and rapidly driven off by a baking cycle of relatively short duration.

A polyester-imide enamelling resin for electrical conductors is described in French patent application 2,637 filed on July 23, 1965 by this company for "Mixed Polyester and Trimellitic Polyimide Resins Especially Applicable for the Enamelling of Electrical Conductors." This relates to a polymer formed from alternate units of terephthalate polyester comprising two molecules of the terephthalate component for 2.5 molecules of glycol and 0.5 molecule of glycerine, and trimellitic diimide components obtained by condensation of two molecules of trimellitic anhydride with one molecule of methylene dianiline. Another French patent application, 2,660. was filed Dec. 30, 1965 by this company for "Polymeric Resins Useful for Insulating Applications and More Particularly for the Enamelling of Electrical Conductors" and proposes the use, in place of an aromatic diamine such as methylene dianiline, of the corresponding diisocyanate.

Starting from the investigations made in the course of these studies, new research has led to a composition consisting of a trimellitic polyimide/terephthalate polyester resin, which is flexible and resilient, soluble in butyl acetate alone, or mixed with xylene, and as such suitable for use as a varnish in this solvent mixture for impregnating coils made with polyester-imide enamelled wire.

The present invention has for a primary object impregnating varnishes composed of alternating units of trimellitic diimide, obtained by condensation of trimellitic anhydride and an aromatic diisocyanate, and of hydroxylated terephthalate polyester units, characterized in that the hydroxylated terephthalate polyester results from the transesterification of a mixture of dimethyl terephthalate and adipic acid with a mixture of neopentyl glycol and trimethylolopropane. Another characteristic is that the combination of the trimelliitc diimide and the terephthalate polyester is caried out by esterification in butyl acetate.

In comparing the chemical structures of neopentyl glycol and ethylene glycol

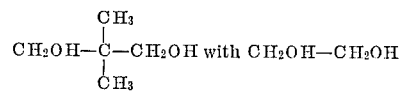

and of trimethylolpropane and glycerine

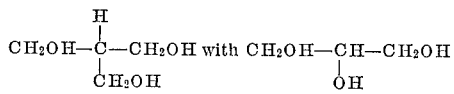

it is evident that the bulkier character of the two first materials in each case results, in the polyester state, in a less compact structure, thus facilitating slippage of the molecules on deformation. Flexibility is equaly known to be obtainable by incorporating a flexible methylene chain such as the radical $(CH_2)_4$ contained in adipic acid of which the useful proportion is limited by the lowering of thermal stability which this additive brings about. The substitution of trimethylolopropane improves the solubility characteristics considerably by comparison with those imparted by glycerine, the solubility in the butyl acetate-xylene mixture being equally improved by the presence of neopentyl glycol in place of ethylene glycol.

Thus, the choice of polyols for esterifying the terephthalic unit and the inclusion of an amount of adipic acid meet the properties dictated by the double requirement of flexibility and solubility while retaining the desired thermal stability. It has been found that the most advantageous polyester group, taking into account all of the considerations, is represented by the formula

| | Moles |
|---|---|
| Dimethyl terephthalate | 3 |
| Adipic acid | 2 |
| Neopentyl glycol | 4.5 |
| Trimethylolpropane | 1.5 | corresponding to a structure of five diacid elements for six polyol elements, and designated hereafter by the name "polyester 6/5." It is better in the form of the polyester-imide combination than the polyester of shorter chain length and lesser adipic content:

| | Moles |
|---|---|
| Dimethylterephthalate | 2 |
| Adipic acid | 1 |
| Neopentyl glycol | 3 |
| Trimethylolpropane | 1 | designated as "polyester 4/3."

In all cases it was found advisable to retain a mole ratio between diol and triol of 3:1 with a mole ratio between polyols and diacids between 6/5 and 4/3, and a proportion of adipic acid not exceeding 40 mole percent of the total acid groups. The resulting polyesters of short chain and terminated on their extremities by hydroxyl groups contain in addition, on the average, from one to two free lateral hydroxyl groups situated along the chain, the presence of which improves the properties of adhesion and permits the curing of the varnish during baking after impregnation.

With regard to the trimellitic diimide groups, one prepares them in the form of molecular units with reactive carboxyl groups at their extremities by treating trimellitic anhydride with an aromatic diisocyanate, such as that of methylene dianiline, in a mole ratio of 2:1 in a medium of butyl acetate serving as the final solvent for the varnish.

In this reaction it is the anhydride groups of trimellitic anhydride which react first to give the structure

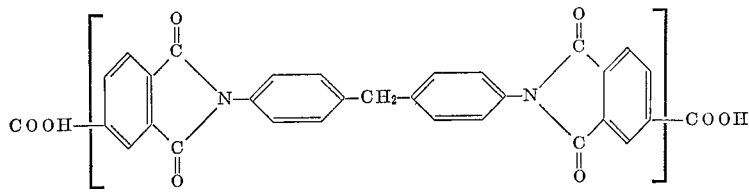

and splitting off carbon dioxide gas.

If one designates the trimellitic element by T and the diisocyanate element by D one can represent the central part by the schematic T—D—T.

The reason for the use of the diisocyanate of methylene dianiline in preference to methylene dianiline itself which leads to the same reaction by an addition mechanism resides in the fact that the commercial diisocyanates containing a proportion of polyisocyanates are less expensive and usable provided certain precautions indicated below are followed.

The reaction between the two precondensates is carried out adding the polyester to a non-crystalline TDT gel in butyl acetate solvent. This gel reacts progressively to give a macromolecular structure shown schemaically as —polyester/T—D—T/polyester/T—D—T— by reaction between the OH groups of the polyester and the carboxyl groups of the T—D—T.

To obtain the 6/5 polyester one introduces into a flask fitted with a Vireux column the equivalent weights of

| | G. |
|---|---|
| 3 moles dimethylterephthalate | 582 |
| 2 moles adipic acid | 292 |
| 4.5 moles neopentyl glycol | 468 |
| 1.5 moles trimethylolpropane | 201 |

One adds at the start about 180 g. of xylene which facilitates the operation by solublizing the sublimed dimethylterephthalate and in assisting removal of the volatile constituents which have split off. When, by elevation of the temperatures, the reaction mixture has become liquid, one adds about 1.4 grams of litharge catalyst for the transesterification. Heating is continued, the temperature being raised progressively to about 230° C. until all distillation of methanol and water have ceased. The yield of the polyester prepolymer 6/5 is 97% of the theoretical yield.

In order to obtain the trimellitic diimide, one first dissolves in 2500 grams of commercial butyl acetate the weight equivalent to 2 gram molecules of trimellitic anhydride, about 384 grams. When solution by warming is complete one adds the equivalent in weight of one gram molecule of the diisocyanate of methylene dianiline, about 250 grams, dissolved in butyl acetate. By heating in about 15 minutes to 100° C. one observes a precipitate of gel corresponding to the combination of the two reactants. The diisocyanate of methylene dianiline is obtainable commercially under the trade designation Desmodur VL. At this stage one adds 1279 grams of the polyester 6/5 representing the equivalent weight of the OH-polyester-OH unit with the addition of about 1500 grams of butyl acetate solvent.

The temperature is raised progressively to 200° C. whereas the hydroxylated terephthalate polyester of ethylene glycol and glycerine is insoluble in butyl acetate, the polyester of the mixed constituents does dissolve and reacts progressively with the TDT gel. One observes a gradual increase of the viscosity, the stabilization of which corresponds to the end of the reaction. The chestnut colored pasty mass dissolves without difficulty in the butyl acetate to give a clear solution and tolerates cutting of the acetate with xylene up to the limit of two volumes of the latter to one of the former.

The varnish concentration thus obtained is about 33% resin. An adequate curing agent is tritolyl isocyanate (obtainable under the trade designation Desmodur CT) blocked by trimethylolpropane added in the form of a solution of about 70% in butyl acetate which one incorporates into the varnish by vigorous mixing. A proportion of Desmodur CT of 4–6% by weight of the resin gives the best results in terms of thermal stability, measured by weight loss in a ventilated oven at 200° C. For a varnish of 4% Desmodur CT this loss rises to 10% in the course of the first fifty hours but does not exceed 11% at the end of the subsequent 150 hours. The flexibility of the varnish obtained can be measured by enamelling an aluminum sheet of 50 microns with a layer of varnish of $^{10}\!\!/_{100}$ micron on both sides. After aging the enamelled sheet is capable of being bent to 180 degrees without rupture of the interior and exterior films of the varnish.

The resin of the present varnish possesses complete compatibility with a polyester-imide enamel used on enamelled wires for coils of electric motors and there is no attack on the wires by the solvent of the impregnating varnish. This solvent, light and noncorrosive, is easily eliminated thus resulting in short cure temperatures. After impregnation and curing, the polyimide impregnating resin shows the physical, mechanical, and thermal characteristics, in particular of flexibility and resistance to thermal degradation, which justifies its use for the type of insulation intended.

What I claim as new and desire to secure by Letters Patent of the United States is:

1. A varnish having alternate trimellitic diimide and hydroxylated terephthalate polyester groups, said trimellitic diimide groups being obtained by condensation of two moles of trimellitic anhydride and one mole of aromatic diisocyanate, said polyester groups being derived from the transesterification of a mixture of dimethyl terephthalate and adipic acid with a mixture of enopentyl glycol and trimethylol propane such that the mole ratio of diol to triol is 3/1 and the mole ratio of polyol to acid ranges from about 6/5 to 4/3, said varnish being made by reacting about 1.5 parts of the trimellitic anhydride, about 1 part of the diisocyanate and about 5.1 parts of the polyester to form a resin, and dissolving the resin a solvent selected from the group consisting of butyl acetate and a mixture of butyl acetate and xylene.

2. A varnish as in claim 1 wherein the mole ratio of dimethyl terephthalate to adipic acid as at least 3 to 2.

3. A varnish as in claim 1 wherein the mole ratio of neopentyl glycol to trimethylol propane is about 2.

4. A varnish as in claim 1 wherein the solvent is butyl acetate.

5. A varnish as in claim 1 wherein the solvent is a mixture of up to two volumes of xylene to one volume of butyl acetate.

6. An insulated electrical coil impregnated with the varnish of claim 1.

References Cited

UNITED STATES PATENTS

| 2,935,487 | 5/1960 | Fox et al. | 260—45.4 |
| 3,314,923 | 4/1967 | Muller et al. | 260—78 |

MORRIS LIEBMAN, Primary Examiner

R. ZAITLEN, Assistant Examiner

U.S. Cl. X.R.

260—857

UNITED STATES PATENT OFFICE
CERTIFICATE OF CORRECTION

Patent No. 3,532,661　　　　　Dated October 6, 1970

Inventor(s)　Henri P. Vayson de Pradenne

It is certified that error appears in the above-identified patent and that said Letters Patent are hereby corrected as shown below:

Claim 1, line 50, after "resin" (second occurrence)

insert - in -

SIGNED AND
SEALED
DEC 8 1970

(SEAL)
Attest:

Edward M. Fletcher, Jr.
Attesting Officer

WILLIAM E. SCHUYLER, JR.
Commissioner of Patents